US012132276B2

(12) United States Patent
Ling et al.

(10) Patent No.: US 12,132,276 B2

(45) Date of Patent: Oct. 29, 2024

(54) WATERTIGHT JOINT AND PLUG-IN DEVICE

(71) Applicant: QINGDAO QIYUAN CXINKEJI CO., LTD, Shandong (CN)

(72) Inventors: Wei Ling, Shandong (CN); Jun Huang, Shandong (CN)

(73) Assignee: QINGDAO QIYUAN CXINKEJI CO., LTD, Shandong (CN)

( * ) Notice: Subject to any disclaimer, the term of this patent is extended or adjusted under 35 U.S.C. 154(b) by 334 days.

(21) Appl. No.: 17/764,483

(22) PCT Filed: Oct. 15, 2021

(86) PCT No.: PCT/CN2021/124225

§ 371 (c)(1),
(2) Date: Mar. 28, 2022

(87) PCT Pub. No.: WO2022/121500

PCT Pub. Date: Jun. 16, 2022

(65) Prior Publication Data

US 2023/0050137 A1 Feb. 16, 2023

(30) Foreign Application Priority Data

Dec. 7, 2020 (CN) ......................... 202022930722.0

(51) Int. Cl.
*H01R 13/52* (2006.01)
*H01R 13/502* (2006.01)
(Continued)

(52) U.S. Cl.
CPC ......... *H01R 13/523* (2013.01); *H01R 13/502* (2013.01); *H01R 13/623* (2013.01); *H01R 24/38* (2013.01)

(58) Field of Classification Search
CPC .. H01R 13/523; H01R 13/502; H01R 13/623; H01R 24/38
(Continued)

(56) References Cited

U.S. PATENT DOCUMENTS 3,605,069 A * 9/1971 Dorrell ................ H01R 13/623 285/361
3,816,641 A * 6/1974 Iversen ................ H01R 13/523 174/76

(Continued)

FOREIGN PATENT DOCUMENTS

CN 201234012 Y 5/2009
CN 101895034 A 11/2010

(Continued)

OTHER PUBLICATIONS

International Search Report for PCT/CN2021/124225, mailed Jan. 14, 2022, 5 pages.

(Continued)

*Primary Examiner* — Abdullah A Riyami
*Assistant Examiner* — Vladimir Imas
(74) *Attorney, Agent, or Firm* — Klarquist Sparkman, LLP

(57) ABSTRACT

A watertight joint and a plug-in device are provided. The watertight joint includes a gland, a plug, an end cap and a sleeve cover, wherein the end cap includes a cable, a wrapping body and a sealing ring, wherein the wrapping body is wrapped on the cable and in a cone-shaped structure, and the sealing ring is sleeved over the second end of the wrapping body, the plug is fixedly connected to the port of the cable, the sleeve cover and the gland are sleeved over the wrapping body, opposite to each other, and the sleeve cover and the gland are in threaded connection, and the inner wall of sleeve cover abuts on the sealing ring.

18 Claims, 3 Drawing Sheets

(51) Int. Cl.
*H01R 13/523* (2006.01)
*H01R 13/623* (2006.01)
*H01R 24/38* (2011.01)

(58) Field of Classification Search
USPC .......................................................... 439/271
See application file for complete search history.

(56) References Cited

U.S. PATENT DOCUMENTS 4,053,201 A * 10/1977 Grappe ................ H01R 13/523 439/604
4,310,213 A * 1/1982 Fetterolf, Sr. ........ H01R 13/516 439/469
4,355,855 A * 10/1982 Rebikoff .............. H01R 13/523 439/445
4,545,633 A * 10/1985 McGeary ........... H01R 13/6277 439/675
4,795,360 A * 1/1989 Newman ............ H01R 13/5221 439/279
5,100,341 A * 3/1992 Czyz .................... H01R 13/562 439/447
6,010,348 A * 1/2000 Alden .................. H01R 13/506 439/681
6,268,565 B1 * 7/2001 Daoud ................. H02G 3/0675 285/348
6,623,289 B2 * 9/2003 Decicco ............... H01R 13/527 439/271
7,150,642 B1 * 12/2006 Bakke ................ H01R 13/5219 439/271
8,007,302 B2 * 8/2011 Kleinke ............... H01R 13/521 439/589
8,657,624 B2 * 2/2014 Yoshida ............. H01R 13/5219 439/578
8,920,044 B2 * 12/2014 Shimazu .............. G02B 6/3879 385/72
9,300,078 B2 * 3/2016 Liu ...................... G02B 6/3816
9,437,962 B2 * 9/2016 Liu .................... H01R 13/5219
9,768,529 B2 * 9/2017 Starke .................. H01R 13/512
9,960,521 B2 * 5/2018 Armstrong ........... H01R 13/516
10,141,684 B2 * 11/2018 Itzler .................. H01R 13/5205
10,431,922 B2 * 10/2019 Surana ................... H01R 13/10
11,165,205 B2 * 11/2021 Dube ................... H01R 13/187
11,515,665 B2 * 11/2022 Bobelis ................ H01R 13/623
2008/0171466 A1 7/2008 Buck et al.
2009/0305542 A1 * 12/2009 Masuzaki ............ G02B 6/3891 439/271
2019/0179090 A1 * 6/2019 Zseng .................. G02B 6/3893
2021/0371054 A1 * 12/2021 Montague ............... B63B 32/10
2022/0077628 A1 * 3/2022 Roewekaemper ........................... H01R 13/4367

FOREIGN PATENT DOCUMENTS

CN 104425973 A 3/2015
CN 104538788 A 4/2015
CN 206650260 U 11/2017
CN 213989354 U 8/2021

OTHER PUBLICATIONS

Written Opinion for PCT/CN2021/124225, mailed Jan. 14, 2022, 6 pages.

* cited by examiner

WATERTIGHT JOINT AND PLUG-IN DEVICE

CROSS-REFERENCE TO RELATED APPLICATION

This is the U.S. National Stage of International Application No. PCT/CN2021/124225, filed Oct. 15, 2021, which was published in English under PCT Article 21 (2), which in turn claims priority of Chinese patent application with the filing number 202022930722.0 filed on Dec. 7, 2020 with the Chinese Patent Office, and entitled "Watertight Joint and Plug-in Device", the contents of which are incorporated herein by reference in entirety.

TECHNICAL FIELD

The present disclosure relates to the technical field of watertight plug-in, in particular to a watertight joint and a plug-in device.

BACKGROUND ART

Existing underwater machinery equipment basically needs to use watertight joints. The watertight joints can realize the quick connection and disassembly and replacement of various kinds of equipment, can also quickly realize the function expansion of the machinery equipment through the reserved interface(s), and realize machinery modular design, which greatly facilitate the repair and maintenance of underwater equipment. It can be said that watertight joints are necessary and key components used in underwater machinery, especially watertight joints used in deep water with a depth of more than 350 M are scarce in the market, the main reason is still that waterproofing effect cannot be solved, and it cannot be mass-produced. The tail of the existing watertight joint is generally filled and sealed with glue, which waterproof method generally can only be used in water with a water depth of 0-200 m, otherwise, the joint part of the glue and the cable may easily fall off, resulting in water leak. The other is to use rubber injection molding to wrap the joint as a whole, here, if a large-depth waterproof joint is desired to be achieved by this method, it needs to be made very large, and the cable and rubber cannot be well combined, and vulcanization treatment must be used for well combination, this method is an expensive and complicated process, and is not suitable for mass-production.

SUMMARY

The present disclosure proposes a watertight joint and a plug-in device, the watertight joint and the plug-in device can realize underwater use with water depth of more than 350 m, have the advantages of small size, convenient installation, low cost, can achieve rapid mass production and is not prone to fall off and leak water.

The present disclosure uses the following technical solutions:

a watertight joint, comprising a gland, a plug, an end cap and a sleeve cover, wherein the end cap comprises a cable, a wrapping body and a sealing ring, wherein the wrapping body may be wrapped on the cable and in a cone-shaped structure, and the sealing ring may be sleeved over the second end of the wrapping body, the plug may be fixedly connected to the port of the cable, the sleeve cover and the gland may be sleeved over the wrapping body, opposite to each other, and the sleeve cover and the gland may be in threaded connection, and the inner wall of sleeve cover may abut on the sealing ring.

Optionally, the plug may be welded with the port of the cable.

Optionally, the cable, the wrapping body and the sealing ring may be in an integrally formed structure.

Optionally, the sealing ring may be an elastic member.

Optionally, the diameter of the wrapping body may increase gradually from the first end to the second end, the sleeve cover may be sleeved over the second end from the first end, and the inner wall of the sleeve cover may abut on the outer wall of the wrapping body.

Optionally, one end of the sleeve cover close to the gland may be provided with an external thread, the gland may be provided with an internal thread, and the external thread may be matched and connected with the internal thread.

Optionally, one end of the sleeve cover away from the gland may be provided with the external thread or the internal thread.

Optionally, the plug may be a male plug or a female plug.

A watertight plug-in device may comprise at least two watertight joints, the plug of one of the two adjacent watertight joints may be a male plug, the plug of the other watertight joint may be a female plug, the male plug may be cooperated with and plugged in the female plug, and the sleeve cover of one of the two adjacent watertight joints may be in threaded connection with the sleeve cover of the other watertight joint.

Optionally, the watertight plug-in device also may comprise a seal loop, and the seal ring may be provided between the two sleeve covers, and surround the installation holes of the sleeve covers.

The beneficial effects of the present disclosure compared with the prior art are at least as follows: the watertight joint and the plug-in device can realize long-term underwater use with water depth of more than 350 m, and have the advantages of small size, convenient installation, low cost, being capable of achieving rapid mass production, being not prone to fall off and leak water, and good reliability.

REFERENCE SIGNS

Figure 1:
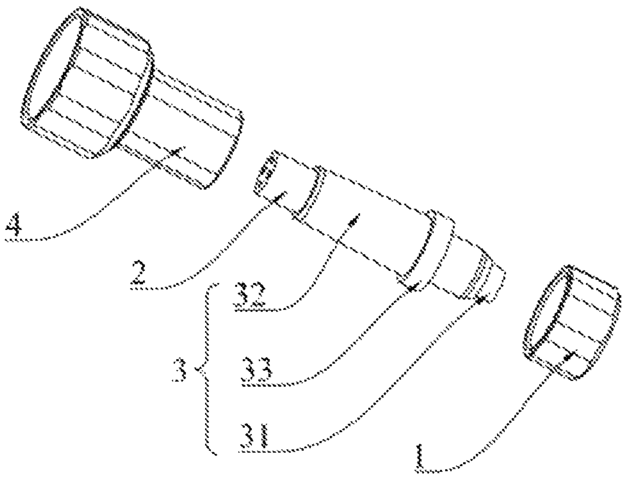
FIG. 1 is an exploded schematic view of a watertight joint provided by an embodiment of the present disclosure.
Figure 2:
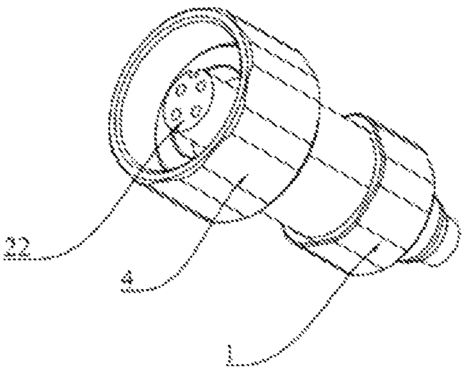
FIG. 2 is a structural schematic view of a watertight joint provided by an embodiment of the present disclosure.
Figure 3:
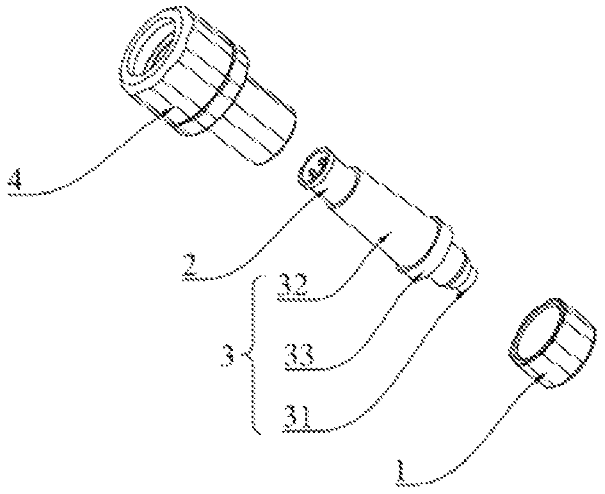
FIG. 3 is an exploded schematic view of a watertight joint provided by another embodiment of the present disclosure.
Figure 4:
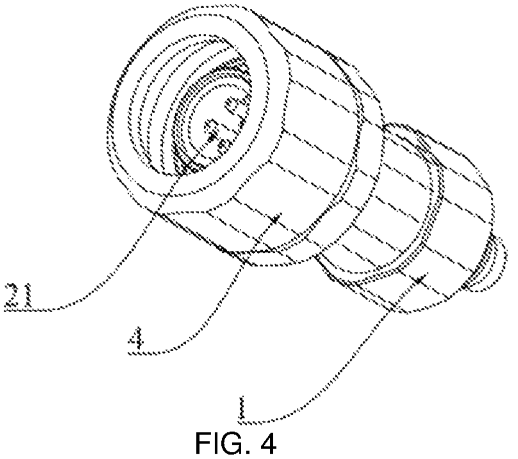
FIG. 4 is a structural schematic view of a watertight joint provided by an embodiment of the present disclosure.

1—gland; 2—plug; 21—male plug; 22—female plug; 3—end cap; 31—cable; 32—wrapping body; 33—sealing ring; 4—sleeve cover; 5—seal ring.

DETAILED DESCRIPTION OF EMBODIMENTS

In order to make the technical problems solved by the present disclosure, the technical solutions adopted and the technical effects achieved clearer, the technical solutions of the present disclosure are further described below with reference to the drawings and through embodiments.

The specific structure of the watertight joint according to the embodiments of the present disclosure will be described below with reference to FIG. 1 to FIG. 4.

As shown in FIG. 1 to FIG. 4, the present embodiment provides a watertight joint, which may comprise a gland 1, a plug 2, an end cap 3 and a sleeve cover 4, wherein the end cap 3 may include a cable 31, a wrapping body 32 and a sealing ring 33, wherein the wrapping body 32 may be wrapped on the cable 31 and in a cone-shaped structure, and the sealing ring 33 may be sleeved over the second end of the wrapping body 32, the plug 2 may be fixedly connected to the port of the cable 31, the sleeve cover 4 and the gland 1 may be sleeved over the wrapping body 32, opposite to each other, and the sleeve cover 4 and the gland 1 may be in threaded connection, and the inner wall of sleeve cover 4 may abut on the sealing ring 33.

It should be noted that since the wrapping body 32 may be wrapped on the cable 31 and in a cone-shaped structure, on one hand, it plays a role of protecting the cable 31, and on the other hand, the sleeve cover 4 and the gland 1 are sleeved over the wrapping body 32 opposite to each other, and the sleeve cover 4 and the gland 1 may be enabled to abut on the outer side wall of the wrapping body 32 due to the cone-shaped structure of the wrapping body 32, and the pressing force of a front side surface and the outer side wall gradually increases, so that the tightness is good. A sealing ring 33 is additionally provided on the basis of the wrapping body 32, and the inner wall of the sleeve cover 4 abuts against the sealing ring 33 and then is in threaded connection with the gland 1, which can effectively avoid the phenomenon of water leakage occurring at the connection gap of the sleeve cover 4 and the gland 1, and further improve the sealing performance. In addition, the plug 2 is fixedly connected to the port of the cable 31, to enable the two to be in electrical connection, so as to facilitate plug-in cooperation with other watertight joints or underwater equipment. To sum up, the watertight joint in the present disclosure is simpler in structure and smaller in volume, and the provided cone-shaped structure of the wrapping body 32 can achieve the compression sealing of the front side surface and the outer side wall, and can achieve that for the water depth above 350 m, the pressing force is getting larger, and the sealing performance is getting better, effectively reducing the risk of water leakage, and the watertight joint can be quickly mass-production and has a good reliability.

Optionally, the plug 2 may be welded with the port of the cable 31. It can be understood that the plug 2 and the port of the cable 31 are subjected to weld processing, so that the plug 2 is fixedly connected to the port of the cable 31, so as to realize the electrical connection between the plug 2 and the cable 31. The method of welding makes the connection between the plug 2 and the cable 31 more firm and stable, without the help of other connecting parts, and the cost is low. Of course, in other embodiments of the present disclosure, other connection methods may be selected for connection between the plug 2 and the port of the cable 31, which is not specifically limited herein.

Optionally, the cable 31, the wrapping body 32 and the sealing ring 33 are in an integrally formed structure.

It should be emphasized that after the plug 2 is welded with the port of the cable 31, the outer skin of the cable 31 after chemical treatment with butanone is softened and has stronger adhesion, and then the wrapping body 32 and the sealing ring 33 are injection-molded on the cable 31 with a mold, and the injection molding material used for injection molding is the same as the material of the outer skin of the cable 31, and finally the end cap 3 with an integrated structure is obtained.

Optionally, the sealing ring 33 may be an elastic member. It can be understood that selecting the elastic member as the sealing ring 33 can play the role of protecting the sleeve cover 4, and the sealing ring 33 has an elastic force and thus a better pressing effect, thereby improving the sealing performance.

Optionally, the diameter of the wrapping body 32 may increase gradually from the first end to the second end, the sleeve cover 4 may be sleeved over the second end from the first end, and the inner wall of the sleeve cover 4 may abut on the outer wall of the wrapping body 32. It can be understood that the sleeve cover 4 allows the wrapping body 32 to be inserted therein starting from the first end to the second end, so that the inner wall component of the sleeve cover 4 abuts on the outer wall of the wrapping body 32, the pressing force gradually increases, and the sealing effect is better.

Optionally, one end of the sleeve cover 4 close to the gland 1 may be provided with an external thread, the gland 1 may be provided with an internal thread, and the external thread is matched and connected with the internal thread.

It can be understood that since the sleeve cover 4 is provided with the external thread and the gland 1 is provided with the internal thread, and both are in threaded connection, which can avoid affecting the abutment of the inner wall of the sleeve cover 4 on the sealing ring 33. Of course, in other embodiments of the present disclosure, the sleeve cover 4 may be provided with the internal thread, and the gland 1 may be provided with the external thread, and both may be in threaded connection.

Optionally, one end of the sleeve cover 4 away from the gland 1 may be provided with the external thread or the internal thread. It can be understood that one end of the sleeve cover 4 of one watertight joint away from the gland 1 may be provided with the external thread, and one end of the sleeve cover 4 of the other watertight joint away from the gland 1 may be provided with the internal thread, and the two may be in threaded connection with each other, so as to facilitate plug-in cooperation between plug 2 and plug 2.

Optionally, the plug 2 may be a male plug 21 or a female plug 22. It can be understood that when one of the plugs 2 is a male plug 21 and the other plug 2 is a female plug 22, the male plug 21 and the female plug 22 may be in plug-in cooperation with each other.

The specific structure of the watertight plug-in device according to the embodiment of the present disclosure may be described below with reference to FIG. 5 to FIG. 6.

Figure 5:
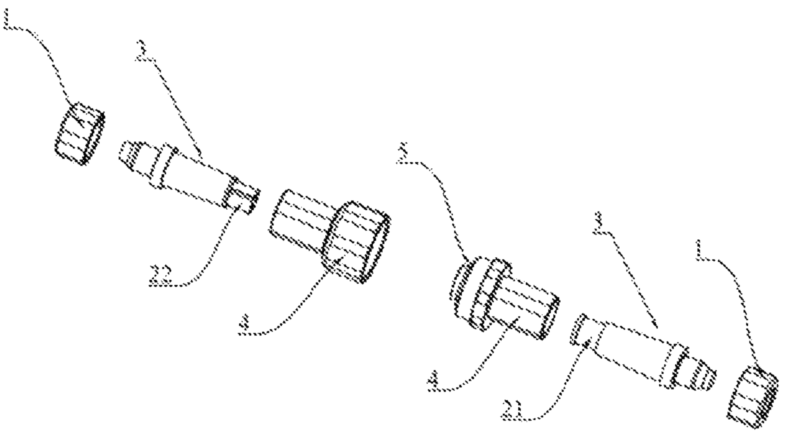
FIG. 5 is an exploded schematic view of a watertight plug-in device provided by an embodiment of the present disclosure.
Figure 6:
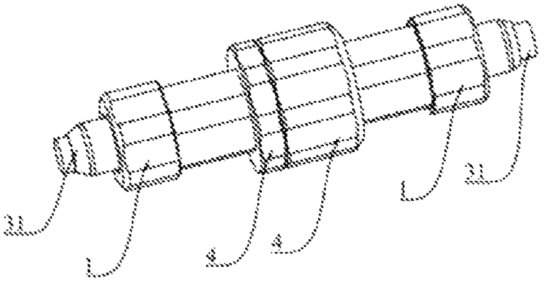
FIG. 6 is a structural schematic view of a watertight plug-in device provided by an embodiment of the present disclosure.

A watertight plug-in device as shown in FIG. 5 and FIG. 6 may include at least two watertight joints, the plug 2 of one of the two adjacent watertight joints may be a male plug 21, the plug 2 of the other watertight joint may be a female plug 22, the male plug 21 is cooperated with and plugged in the female plug 22, and the sleeve cover 4 of one of the two adjacent watertight joints may be in threaded connection with the sleeve cover 4 of the other watertight joint.

It should be noted that the watertight plug-in device in the present disclosure is simpler in structure and smaller in volume, and the provided cone-shaped structure of the wrapping body 32 achieves the compression sealing of the front side surface and the outer side wall, and may achieve that an pressing force for the water depth above 350 m is getting larger, and the sealing performance is getting better, effectively reducing the risk of water leakage, and the watertight plug-in device can be mass-produced and has a good reliability. In addition, after the male plug 21 is plugged into the female plug 22, the watertight plug-in device can be assembled and obtained by rotating and screwing the two sleeve covers 4 together, which is very convenient to install.

Optionally, the watertight plug-in device may further include a seal ring 5, and the seal ring 5 may be provided between the two sleeve covers 4, and surround the installation holes of the sleeve covers 4.

It can be understood that the seal ring 5 is provided between the two sleeve covers 4 of two adjacent watertight joints, which can effectively avoid the phenomenon of water leakage occurring at the gap where the two sleeve covers 4 are connected with each other, and the sealing performance is better.

In the description of the present specification, description with reference to the terms "some embodiments", "other embodiments" and the like means that a specific feature, structure, material or characteristic described in combination with the embodiment or example is included in at least one embodiment or example of the present disclosure. In the present specification, schematic representations of the above terms do not necessarily refer to the same embodiment or example. Furthermore, the specific feature, structure, material or characteristic described may be combined in a suitable manner in any one or more embodiments or examples.

In addition, it should be understood that orientation or positional relations indicated by terms such as "upper", "lower", "inner", "outer", "vertical", and "horizontal" are based on orientation or positional relations as shown in the accompanying drawings, merely for facilitating the description of the present disclosure and simplifying the description, rather than indicating or implying that related devices or elements have to be in the specific orientation, or configured and operated in a specific orientation, therefore, they should not be construed as limitations on the present disclosure.

In the present disclosure, unless otherwise definitely specified and limited, the terms such as "link", "connect", "mount" and "fix" should be understood in a broad sense, for example, they can be fixed connection, detachable connection or integrated connection; they can be mechanical connection or electrical connection; they can be direct connection or indirect connection by intermediate medium, or can be the internal communication between two components or interaction relationship between two components. For those ordinarily skilled in the art, the specific meaning of the above terms in the present disclosure can be understood according to the specific situation.

In addition, the features defined with "first" and "second" may explicitly or implicitly include one or more of the features, which are used to distinguish and describe the features, regardless of order or importance. In the description of the present disclosure, unless stated otherwise, "plurality" means two or more.

The above contents are only preferred embodiments of the present disclosure, and for those ordinarily skilled in the art, based on the idea of the present disclosure, there will be changes in the specific embodiment and application scope, and the contents of the present specification should not be construed as limitations on the present disclosure.

INDUSTRIAL APPLICABILITY

The present disclosure provides a watertight joint and a plug-in device. The watertight joint includes a gland, a plug, an end cap and a sleeve cover, wherein the end cap includes a cable, a wrapping body and a sealing ring, wherein the wrapping body is wrapped on the cable and in a cone-shaped structure, and the sealing ring is sleeved over the second end of the wrapping body, the plug is fixedly connected to the port of the cable, the sleeve cover and the gland are sleeved over the wrapping body, opposite to each other, and the sleeve cover and the gland are in threaded connection, and the inner wall of sleeve cover abuts on the sealing ring. The watertight joint and the plug-in device can realize underwater use with water depth more than 350 m, and have the advantages of small size, convenient installation, low cost, and being capable of achieving rapid mass production and not prone to fall off and leak water.

Furthermore, it can be understood that the watertight joint and the plug-in device of the present disclosure are reproducible and can be used in a variety of industrial applications. For example, the watertight joint of the present disclosure can be used in any underwater machinery equipment.

What is claimed is:

1. A watertight joint, comprising a gland, a plug, an end cap and a sleeve cover, wherein the end cap comprises a cable, a wrapping body and a sealing ring, wherein the wrapping body is wrapped on the cable and in a cone-shaped structure, and the sealing ring is sleeved over the second end of the wrapping body; the plug is fixedly connected to a port of the cable; the sleeve cover and the gland are sleeved over the wrapping body, opposite to each other, and the sleeve cover and the gland are in threaded connection; and an inner wall of sleeve cover abuts on the sealing ring;

wherein the plug is welded with the port of the cable;

wherein the cable, the wrapping body and the sealing ring are in an integrally formed structure.

2. The watertight joint according to claim 1, wherein the sealing ring is an elastic member.

3. The watertight joint according to claim 2, wherein a diameter of the wrapping body increases gradually from a first end to a second end, the sleeve cover is sleeved over the second end from the first end, and the inner wall of the sleeve cover abuts on the outer wall of the wrapping body.

4. The watertight joint according to claim 3, wherein one end of the sleeve cover close to the gland is provided with an external thread, the gland is provided with an internal thread, and the external thread is matched and connected with the internal thread.

5. The watertight joint according to claim 4, wherein one end of the sleeve cover away from the gland is provided with an external thread or an internal thread.

6. The watertight joint according to claim 5, wherein the plug is a male plug or a female plug.

7. A watertight plug-in device, comprising at least two watertight joints according to claim 1, wherein the plug of one of the two adjacent watertight joints is a male plug, the plug of the other watertight joint is a female plug, the male plug is cooperated with and plugged in the female plug, and the sleeve cover of one of the two adjacent watertight joints is in threaded connection with the sleeve cover of the other watertight joint.

8. The watertight plug-in device according to claim 7, wherein the watertight plug-in device further comprises a seal ring, and the seal ring is provided between the two sleeve covers, and surround installation holes of the sleeve covers.

9. The watertight joint according to claim 1, wherein the sealing ring is an elastic member.

10. The watertight joint according to claim 1, wherein the sealing ring is an elastic member.

11. The watertight joint according to claim 1, wherein a diameter of the wrapping body increases gradually from a first end to a second end, the sleeve cover is sleeved over the second end from the first end, and the inner wall of the sleeve cover abuts on the outer wall of the wrapping body.

12. The watertight joint according to claim 1, wherein a diameter of the wrapping body increases gradually from a first end to a second end, the sleeve cover is sleeved over the second end from the first end, and the inner wall of the sleeve cover abuts on the outer wall of the wrapping body.

13. The watertight joint according to claim 1, wherein one end of the sleeve cover close to the gland is provided with an external thread, the gland is provided with an internal thread, and the external thread is matched and connected with the internal thread.

14. The watertight joint according to claim 1, wherein one end of the sleeve cover close to the gland is provided with an external thread, the gland is provided with an internal thread, and the external thread is matched and connected with the internal thread.

15. The watertight joint according to claim 1, wherein one end of the sleeve cover away from the gland is provided with an external thread or an internal thread.

16. The watertight joint according to claim 1, wherein one end of the sleeve cover away from the gland is provided with an external thread or an internal thread.

17. The watertight joint according to claim 1, wherein the plug is a male plug or a female plug.

18. The watertight joint according to claim 1, wherein the plug is a male plug or a female plug.

* * * * *